US006557230B1

(12) United States Patent
Gernstein

(10) Patent No.: US 6,557,230 B1
(45) Date of Patent: May 6, 2003

(54) METHOD OF CONVERTING A TRUCK SLEEPER CAB TO A DAY CAB

(76) Inventor: Dan H. Gernstein, 16572 Hascall St., Omaha, NE (US) 68130

( * ) Notice: Subject to any disclaimer, the term of this patent is extended or adjusted under 35 U.S.C. 154(b) by 0 days.

(21) Appl. No.: 10/164,645

(22) Filed: Jun. 6, 2002

Related U.S. Application Data

(63) Continuation-in-part of application No. 10/026,034, filed on Dec. 21, 2001.

(51) Int. Cl.$^7$ ................................................. B21K 21/16
(52) U.S. Cl. ........................ 29/401.1; 29/897.2; 29/469; 296/190.02
(58) Field of Search ............................ 29/401.1, 897.2, 29/416, 417, 428, 469, 525.06; 296/190.02, 190.08, 190.01, 183, 193, 196, 197, 210; 180/89.12, 89.19

(56) References Cited

U.S. PATENT DOCUMENTS

| | | | |
|---|---|---|---|
| 2,591,380 A | * 4/1952 | Schreiner | .................... 296/183 |
| 3,339,967 A | 9/1967 | Harris | |
| 3,558,180 A | 1/1971 | Algire | |
| 4,014,585 A | * 3/1977 | Earnhart | ..................... 296/16 |
| 4,050,735 A | 9/1977 | Molnar | |
| 4,589,181 A | 5/1986 | Phillips | |
| 4,599,780 A | 7/1986 | Rohrbacher | |
| 4,738,480 A | * 4/1988 | Ward | ......................... 296/24.1 |
| 4,747,670 A | 5/1988 | Devio et al. | |
| 4,775,179 A | 10/1988 | Riggs | |
| 5,000,501 A | 3/1991 | Cunha | |
| 5,305,512 A | 4/1994 | Ward | |
| 5,310,239 A | 5/1994 | Koske et al. | |
| 5,560,673 A | 10/1996 | Angelo | |
| 5,769,486 A | 6/1998 | Novoa et al. | |
| 6,178,612 B1 | 1/2001 | Gernstein | |

* cited by examiner

Primary Examiner—Gregory Vidovich
Assistant Examiner—T. Nguyen
(74) Attorney, Agent, or Firm—Thomte, Mazour & Niebergall; Dennis L. Thomte

(57) ABSTRACT

A method of converting a truck sleeper cab to a day cab comprising the steps of: providing a frame-mounted truck cab having a frame-mounted sleeper cab secured to the rearward end thereof; cutting through the boot which interconnects the sleeper cab to the truck cab; removing the sleeper cab from the truck cab to create first and second openings at the rearward end of the truck cab; providing a roof panel which is designed to close the first opening; providing a back panel which is designed to close the second opening created by the removal of the sleeper cab from the truck cab; and securing the back panel and the roof panel to the truck cab to close the first and second openings whereby the truck cab has the appearance of a day cab.

8 Claims, 7 Drawing Sheets

METHOD OF CONVERTING A TRUCK SLEEPER CAB TO A DAY CAB

CROSS-REFERENCE TO RELATED APPLICATION

This is a continuation-in-part application of Petitioner's earlier application Ser. No. 10/026,034 filed Dec. 21, 2001, entitled A METHOD OF CONVERTING A TRUCK HAVING A RAISED ROOF SLEEPER CAB TO A MID-ROOF CAB.

BACKGROUND OF THE INVENTION

1. Field of the Invention

This invention relates to a method of converting a truck sleeper cab to a day cab. More particularly, the invention relates to a method whereby a Kenworth Aero-Sleeper truck cab having a sleeper cab integrally formed therewith may be converted to a day cab by removing the sleeper cab from the truck cab and replacing the same with a roof panel and a back panel so that the modified truck cab is a day cab rather than a raised roof sleeper cab. More particularly, the method relates to converting Kenworth Aero-Sleeper Model Nos. T600, T800 and W900 to day cabs.

2. Description of the Related Art

Many of the trucks which haul freight across the nation include a sleeper cab integrally formed with the truck or operator's cab so that the driver may, at appropriate times, sleep in the sleeper cab. The truck cabs which include sleeper cabs or compartments are quite large and do serve a very useful purpose while the truck is being used for long hauls. However, the trucks having the truck sleeper cabs are normally removed from long haul service after two or three years due to the expiration of leases, large accumulated mileage, etc. When the trucks having sleeper cabs are removed from long haul service, and are being sold as a used truck, an operator is hesitant to purchase the same for further long haul use due to the normally high mileage thereon. Further, if the trucks having sleeper cabs are to be used for local routes, those trucks, due to the large cab size thereof, are not well-suited for local use.

Used trucks of the type which are commonly referred to as "day cabs," that is, a truck cab without a sleeper compartment, normally have a much larger resale value than truck sleeper cabs because there is a shortage of day cabs.

In applicant's earlier U.S. Pat. No. 6,178,612, a method is described for converting a truck sleeper cab to a day cab. In applicant's co-pending application, a method is described for converting a truck raised roof sleeper cab to a mid-roof cab. Although both of the above methods represent an advance in the art, it is believed that the instant method represents an improvement thereover primarily for the reason that the instant method is directed to a method of converting the Kenworth Aero-Sleeper Model Nos. T600, T800 and W900 cabs to day cabs.

SUMMARY OF THE INVENTION

The method of converting a truck sleeper cab such as Kenworth Aero-Sleeper Model Nos. T600, T800 and W900 to a day cab is described which comprises the steps of: (1) providing a frame-mounted truck cab having rearward and forward ends and including a roof, opposite rear side edges and a floor, the truck cap having a frame-mounted sleeper cab secured thereto which includes an upper forward portion which is complementary in shape to the rearward end of the roof and opposite forward side edges which are complementary in shape to the opposite rear sides edges of the truck cab with the sleeper cab also including a floor which cooperates with the floor of the truck cab and wherein a resilient boot member interconnects the upper forward portion of the sleeper cab to the roof of the truck cab and interconnects the opposite forward side edges of the sleeper cab to the opposite rear side edges of the truck cab; (2) cutting through the boot member so that the boot member does not interconnect the sleeper cab with the truck cab; (3) disconnecting the sleeper cab from the truck frame; (4) removing the sleeper cab from the truck frame and the truck cab thereby creating a first opening in the upper rearward portion of the roof of the truck cab and creating a second opening in the rearward end of the truck cab; (5) providing a roof panel which is designed to close the first opening in the roof of the truck cab; (6) securing the roof panel to the roof of the truck cab to close the first opening; (7) providing a back panel which is designed to close the second opening in the rearward end of the truck cab; (8) securing the back panel to the roof panel and to the opposite rear side edges of the truck cab to close the second opening in the rearward end of the truck cab; and (9) whereby the truck cab has the appearance of a day cab.

It is therefore a principal object of the invention to provide a method of converting a truck sleeper cab to a day cab.

Still another object of the invention is to provide a method of converting a truck sleeper cab to a day cab wherein the resultant day cab closely resembles conventional day cabs.

Still another object of the invention is to provide a method of converting a truck sleeper cab to a day cab wherein fiberglass back and roof panels are used to close the openings created in the back and roof of the cab created by the removal of the sleeper cab.

Still another object of the invention is to provide a method of converting a used truck sleeper cab such as Kenworth Aero-Sleeper Model Nos. T600, T800 and W900 to a day cab which enhances the value of the used truck.

Still another object of the invention is to provide a method of converting a truck sleeper cab to a day cab so that the resultant cab is more suited for local use.

Still another object of the invention is to provide a method of converting a day cab which involves the use of back and roof panels comprised of reinforced fiberglass material with the back and roof panels having interior trim associated therewith.

Still another object of the invention is to provide a method of converting a truck sleeper cab to a day cab which is readily accomplished.

These and other objects will be obvious to those skilled in the art.

DESCRIPTION OF THE PREFERRED EMBODIMENT

Figure 1:
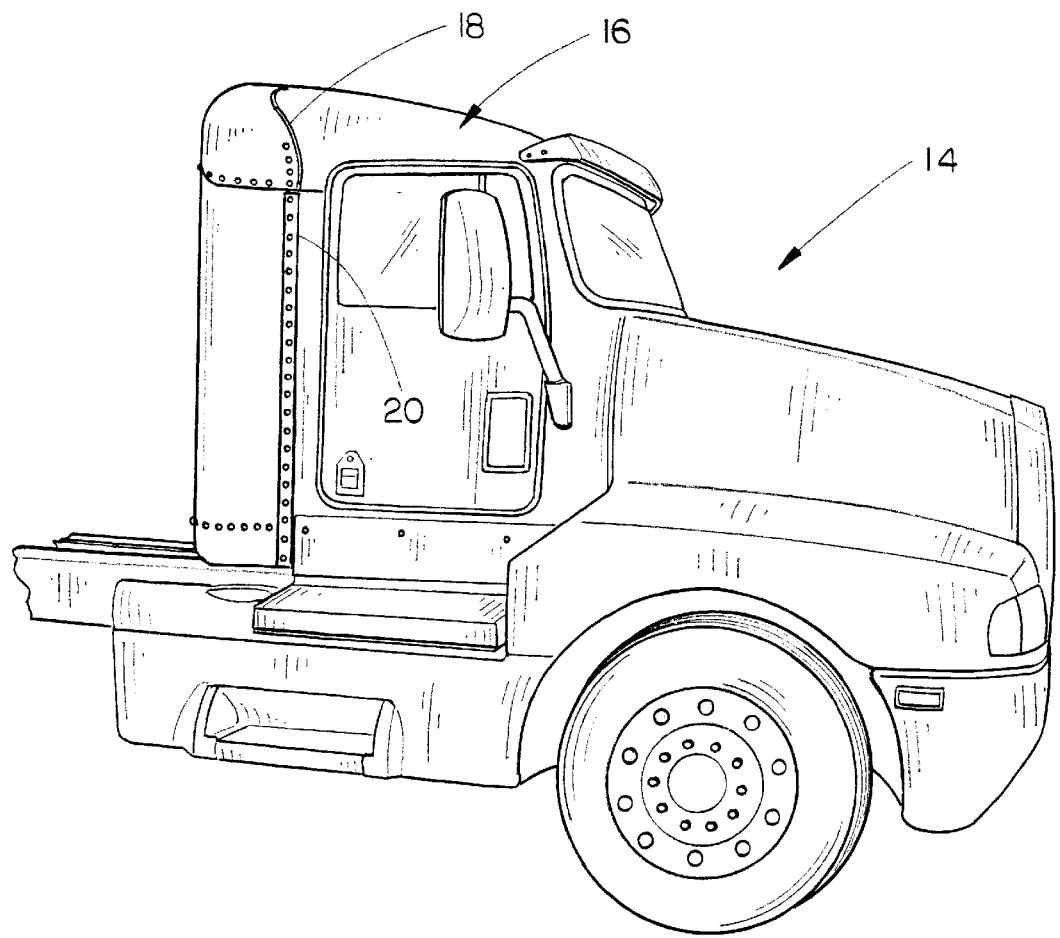
FIG. 1 is a rear perspective view of the finished product of this invention.
Figure 2:
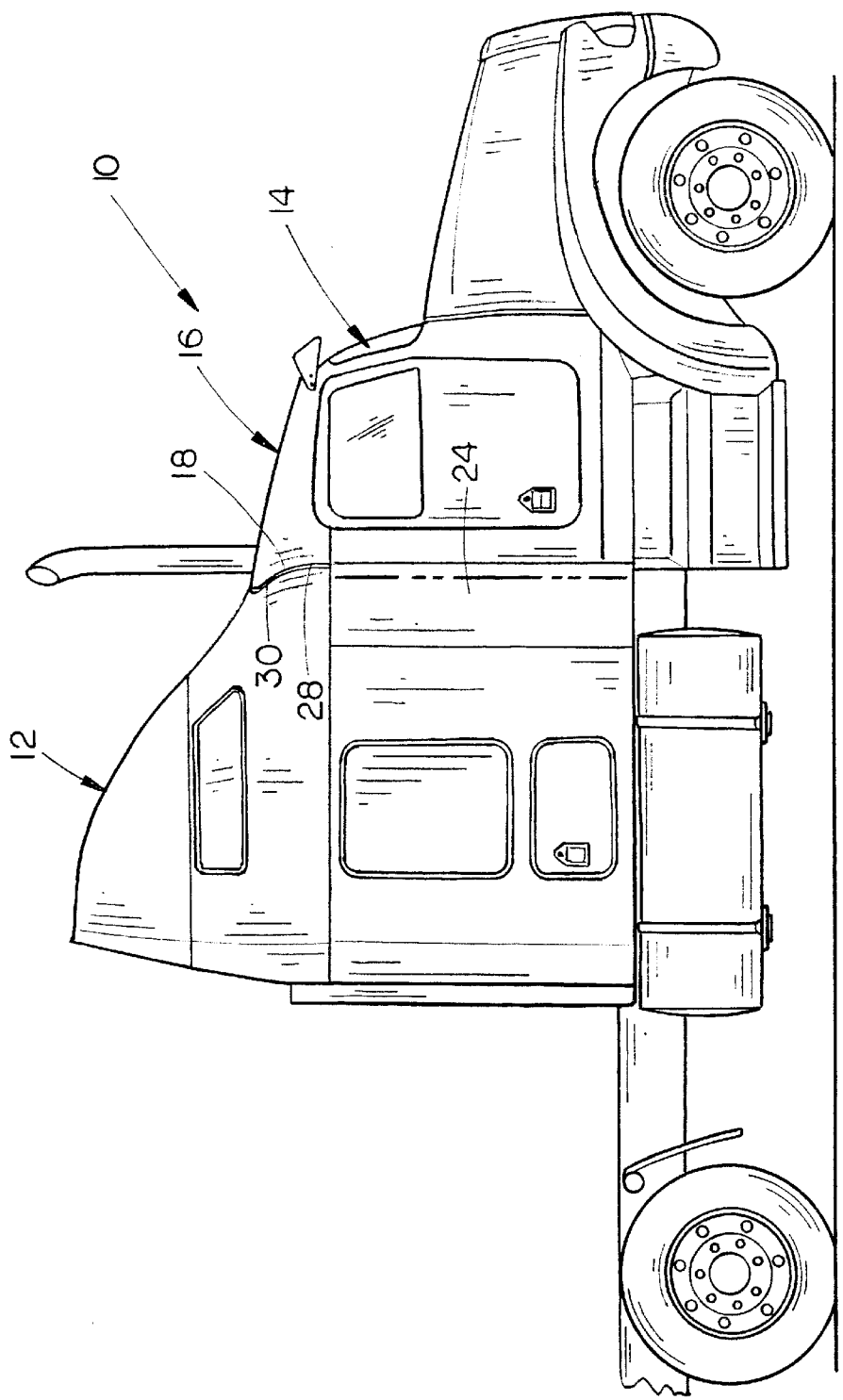
FIG. 2 is a side view of a truck sleeper cab such as Kenworth Aero-Sleeper Model Nos. T600, T800 and W900.

In FIG. 2, the numeral 10 refers to a Kenworth Aero-Sleeper truck of the raised roof truck sleeper cab type such as Model Nos. T600, T800 and W900, including a sleeper cab 12 which is secured to the rear and roof of the driver's cab 14.

Figure 7:
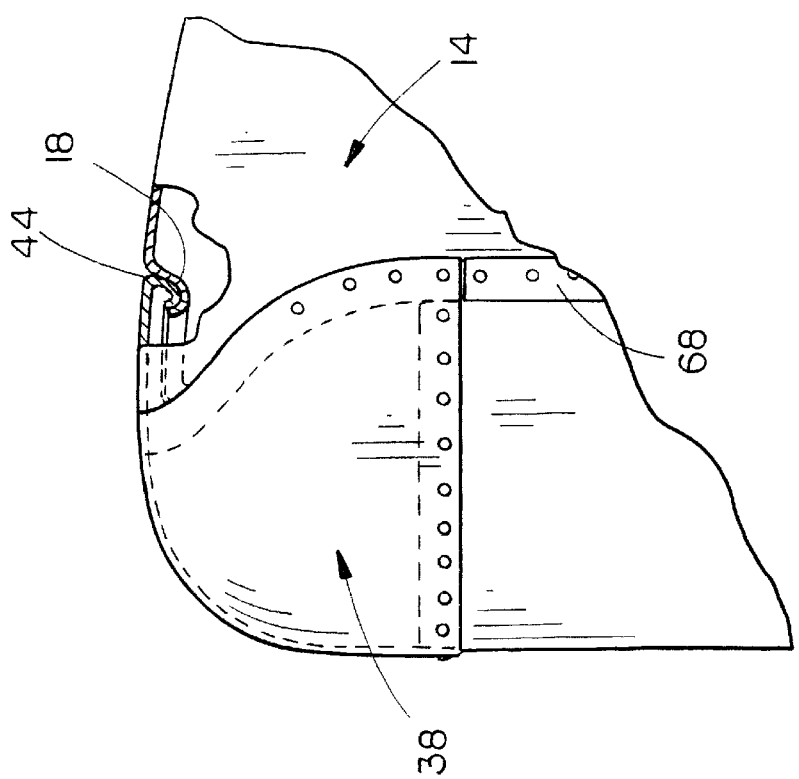
FIG. 7 is a partial side elevational view of the converted truck cab with portions cut away to more fully illustrate the invention.

Normally, the forward end of the cab 14 is hingedly or pivotally connected to the frame of the truck with the rearward end of the sleeper cab 12 being connected to the frame by means of a conventional cab suspension assembly designed to provide a quiet and more comfortable ride within the cab 14 and the sleeper cab 12. For purposes of description, the cab 14 will be described as including a roof portion 16 having an arcuate rearward edge 18. Cab 14 also includes opposite side walls 20 and 22 (not shown). The upper forward end of the sleeper cab 12 is complementary in shape to the rearward edge 18 of roof 16. The sleeper cab 12 includes opposite side portions 24 and 26 (not shown) which are complementary in shape to the rearward edges of the opposite sides 20 and 22, respectively. A resilient boot 28 comprised of rubber, elastomeric material or the like is glued to the rearward side edges 20 and 22 and the rearward edge 18 of cab 14 so that the forward end of the boot member 28 is firmly affixed thereto. The rearward ends of the boot member 28 are glued to the forward ends of the side walls 24 and 26 and to the forward edge 30 of sleeper cab 12 so that the boot member 28 firmly interconnects the sleeper cab 12 to the truck cab 14. As seen in FIG. 7, the rearward edge 18 is arcuate in shape to form a trough to which the forward edge 30 of the sleeper cab 12 is normally connected in addition to the boot member 28. Truck cab 14 also includes a rearwardly extending floor 32 which is complementary to the floor of the sleeper cab.

Figure 3:
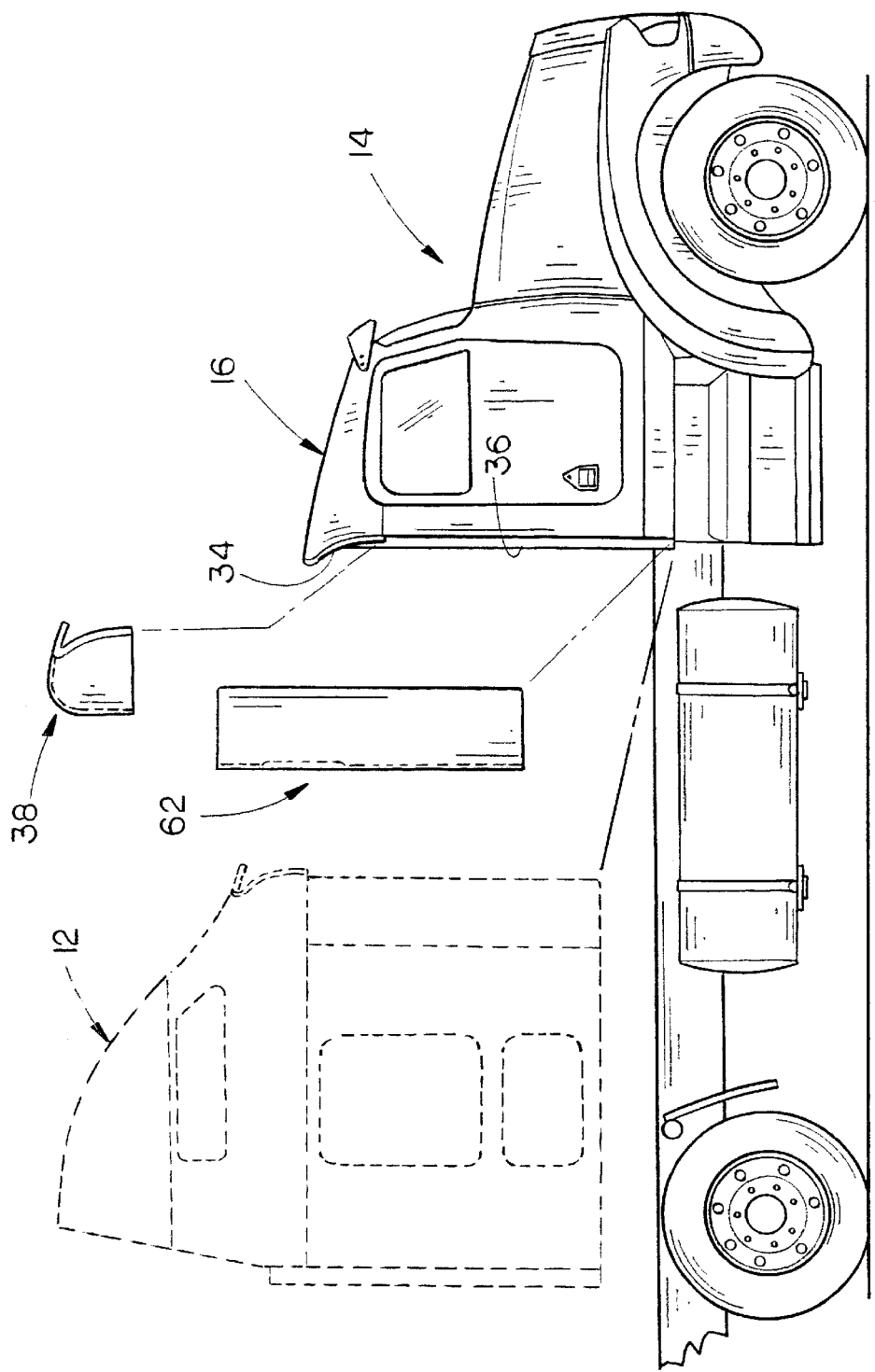
FIG. 3 is an exploded view illustrating the sleeper cab removed from the truck cab and the back and roof panels prior to installation.
Figure 4:
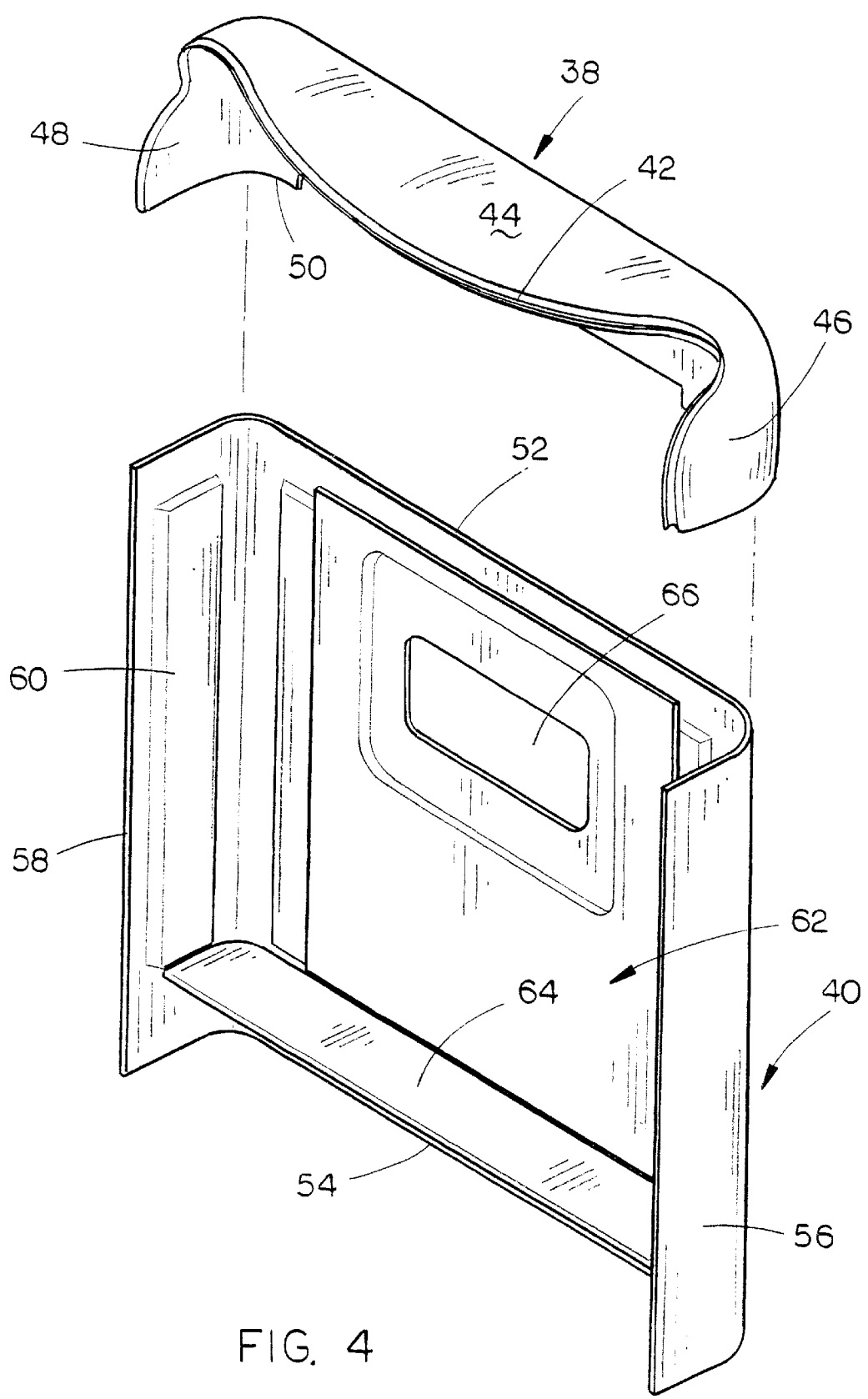
FIG. 4 is a front perspective view of the back panel and roof panel which are used to convert truck sleeper cab to a day cab.
Figure 5:
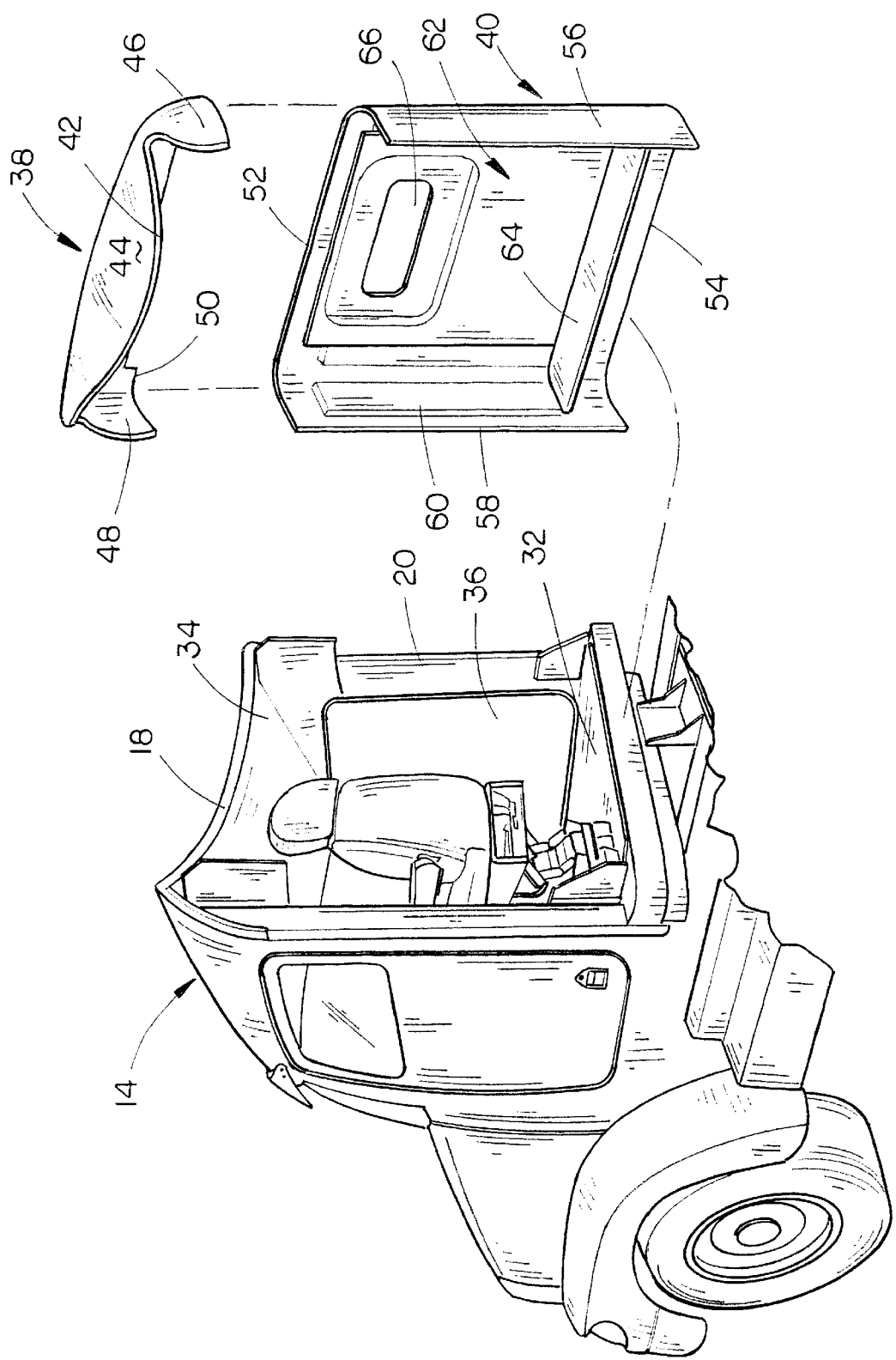
FIG. 5 is a rear perspective view of the truck cab after the sleeper cab has been removed from the truck cab and a front perspective view of the back panel and roof panel prior to installation.

To convert the vehicle 10 a day cab, the sleeper cab 12 must first be removed. The boot 28 is severed or cut through so that the boot 28 does not interconnect the sleeper cab 12 to the truck cab 14. The sleeper cab 12 is then disconnected from the cab suspension assembly and the floor of the sleeper cab 12 is disconnected from the floor 32 of the truck cab 14 if the same are connected together. Sleeper cab 12 is then removed from the rearward end of the cab 14 which creates a first opening 34 at the upper rearward end of the roof 16 and which creates an opening 36 at the rearward end of the cab 14, as seen in FIG. 3. The openings 34 and 36 are closed by means of the roof panel and the back panel 40 which are preferably comprised of a reinforced fiberglass material. As seen in FIG. 5, roof panel 38 includes a forward edge 42 which is complementary in shape to the rearward edge 18 of truck cab 14. For purposes of description, roof panel 38 will be described as including a top portion 44, side portions 46 and 48 and a lower edge 50.

Back panel 40 comprises an upper end 52 and lower end 54. Panel 40 also includes forwardly extending side portions 56 and 58. Panel 40 is provided with reinforcing members 60 molded thereto in conventional fashion. The numeral 62 refers to a molded-in center trim panel to improve the interior appearance of the back panel 40. Back panel 40 also has a forwardly extending floor portion 64 and a window 66.

The roof panel 38 is secured to the roof of the truck cab 14 by positioning the forward edge 42 adjacent the rearward edge 18, as seen in FIG. 7. The forward edge 44 is complementary in shape to the trough shape of the rearward edge 18. A watertight and airtight seal is provided between the roof panel 38 and the truck cab 14. The forward end of the roof panel 38 is riveted or otherwise secured to the rearward end of the truck cab 14, as illustrated in FIG. 7.

Figure 6:
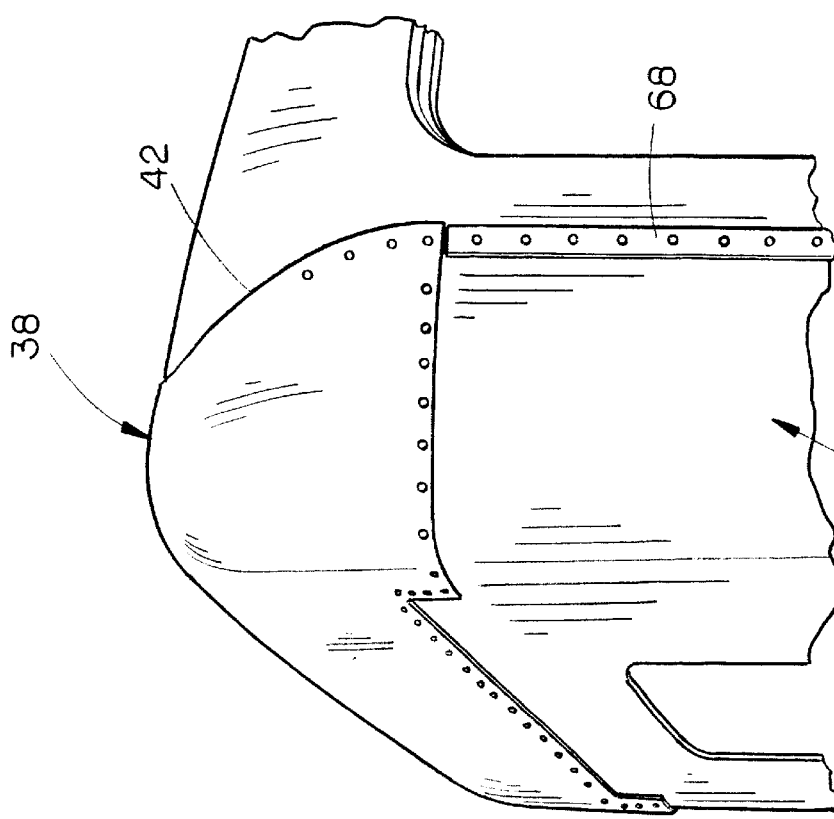
FIG. 6 is a partial rear perspective view of the converted truck cab of FIG. 1.
Figure 8:
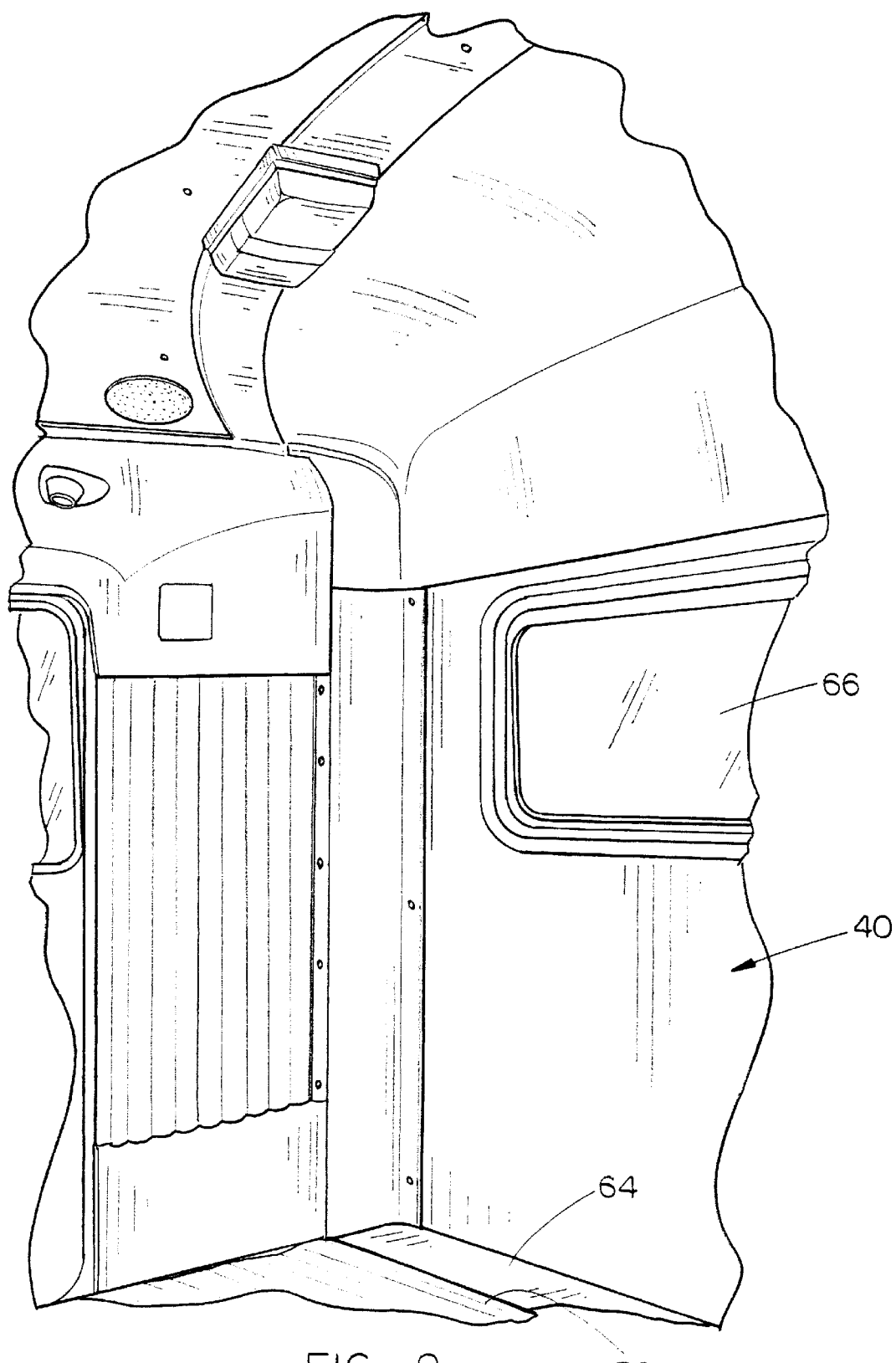
FIG. 8 is a partial front perspective view of the back panel and the roof panel after installation.

The roof panel 38 is then secured to the truck cab 14. Although it has been described as the roof panel 38 is first secured to the truck cab 14, it may sometimes be more convenient to secure the back panel 40 to the truck cab 14 prior to securing the roof panel 38 to the truck cab. Reinforcing strips 68 are then positioned outwardly of the overlapping portions of the forward ends of the sides of the back panel 40 and the rearward sides of the truck cab 14 with rivets or the like then being extended through the strip member 68, back panel 40 and truck cab 14. The upper end of the back panel 40 is riveted or otherwise secured to the lower edge of the roof panel 38, as seen in FIG. 6. When the back panel 40 is installed, the floor portion 64 of back panel 40 cooperates with the floor 32 of the truck cab 14. The rear end of the cab 14 is then connected to the frame, if not already done so, by means of a conventional cab suspension assembly. The interior of the day cab is trimmed as desired.

Thus, it can be seen that the invention accomplishes at least all of its stated objectives.

I claim:

1. The method of converting a truck sleeper cab to day cab, comprising the steps of:

providing a frame-mounted truck cab having rearward and forward ends and including a roof, opposite rear side edges and a floor, the truck cab having a frame-mounted sleeper cab secured thereto which includes an upper forward portion which is complementary in shape to the rearward end of said roof and opposite forward side edges which are complementary in shape to the opposite rear side edges of the truck cab; the sleeper cab also including a floor which cooperates with the floor of the truck cab, said truck cab being mounted on a truck frame; a resilient boot member interconnecting the upper forward portion of the sleeper cab to the roof of the truck cab and interconnecting the opposite forward side edges of the sleeper cab to the opposite rear side edges of the truck cab;

cutting through the boot member so that the boot member does not interconnect the sleeper cab with the truck cab;

disconnecting the sleeper cab from the truck frame;

removing the sleeper cab from the truck frame and the truck cab thereby creating a first opening in the upper rearward portion of the roof of the truck cab and creating a second opening in the rearward end of the truck cab;

providing a roof panel which is designed to close the first opening in the roof of the truck cab;

securing the roof panel to the roof of the truck cab to close the first opening;

providing a back panel which is designed to close the second opening in the rearward end of the truck cab;

securing the back panel to the roof panel and to the opposite rear side edges of the truck cab to close the second opening in the rearward end of the truck cab;

whereby the truck cab has the appearance of a day cab.

2. The method of claim 1 wherein the back panel and the roof panel are comprised of a fiberglass material.

3. The method of claim 1 wherein the back panel is provided with a forwardly extending floor portion which is adapted to cooperate with the floor of the truck cab.

4. The method of claim 2 wherein the back panel has an inside surface with a molded-in center trim panel.

5. The method of claim 2 wherein the roof panel has an inside surface with trim material provided thereon.

6. The method of claim 4 wherein the roof panel has an inside surface with trim material provided thereon.

7. The method of claim 1 wherein the back panel has a window provided therein.

8. The method of claim 2 wherein the back panel has a window provided therein.

* * * * *